United States Patent
Lingren et al.

(10) Patent No.: US 12,396,449 B1
(45) Date of Patent: Aug. 26, 2025

(54) INSECT MONITORING SYSTEM

(71) Applicant: Trécé Inc., Adair, OK (US)

(72) Inventors: Bill Lingren, Adair, OK (US); Jimmy Mason Hudson, Pryor, OK (US); Chris Clay, Chelsea, OK (US)

(73) Assignee: Trécé Inc., Adair, OK (US)

( * ) Notice: Subject to any disclaimer, the term of this patent is extended or adjusted under 35 U.S.C. 154(b) by 0 days.

(21) Appl. No.: 18/513,346

(22) Filed: Nov. 17, 2023

Related U.S. Application Data

(63) Continuation-in-part of application No. 29/901,987, filed on Sep. 7, 2023.

(51) Int. Cl.
  *A01M 1/02* (2006.01)
  *A01M 1/14* (2006.01)
  *A01M 1/16* (2006.01)

(52) U.S. Cl.
  CPC ............ *A01M 1/026* (2013.01); *A01M 1/145* (2013.01); *A01M 1/165* (2013.01)

(58) Field of Classification Search
  CPC .......... A01M 1/026; A01M 1/14; A01M 1/16; A01M 1/145; A01M 1/165
  See application file for complete search history.

(56) References Cited

U.S. PATENT DOCUMENTS

| | | | | |
|---|---|---|---|---|
| 1,112,064 A | * | 9/1914 | Gordon | A01M 1/14 D22/122 |
| 3,755,958 A | * | 9/1973 | Bradshaw | A01M 1/145 43/114 |
| 4,423,564 A | * | 1/1984 | Davies | A01M 1/14 43/121 |
| 4,961,282 A | * | 10/1990 | Hoppe | A01M 1/14 43/114 |
| 5,303,501 A | * | 4/1994 | Seemann | A01M 1/026 434/428 |
| 5,396,729 A | * | 3/1995 | Vejvoda | A01M 1/026 43/114 |
| 5,477,636 A | * | 12/1995 | Musket | A01M 1/14 43/114 |
| 6,393,760 B1 | * | 5/2002 | Lingren | A01N 31/14 43/107 |
| 6,516,558 B1 | * | 2/2003 | Lingren | A01M 1/14 43/107 |
| 8,079,175 B2 | * | 12/2011 | Calkins | A01M 1/145 43/115 |
| 8,793,927 B2 | * | 8/2014 | Winkler | A01M 1/02 43/107 |
| 9,089,121 B2 | * | 7/2015 | Diclaro, II | A01M 1/20 |

(Continued)

*Primary Examiner* — Michael H Wang
(74) *Attorney, Agent, or Firm* — Rimon Law, P.C.

(57) ABSTRACT

An insect monitoring system for use in agricultural fields is provided. The monitoring system has a chemical lure to attract insects to the monitoring system, and an adhesive material on which insects drawn to the lure can be trapped for later evaluation. The monitoring system also has a three-piece canopy made of two opposing sides and a cover. The parallel sides are roughly triangular and the cover sits above, and is attached to, the sides. The adhesive trap is held vertically between the two opposing sides of the canopy. The lure is held horizontally above the adhesive trap by being inserted through slits in the cover. The canopy can be assembled from a flat sheet of a prepatterned rigid material.

9 Claims, 6 Drawing Sheets

(56) References Cited

U.S. PATENT DOCUMENTS

| | | | |
|---|---|---|---|
| 9,861,090 B2* | 1/2018 | Heath | A01M 1/2016 |
| 10,375,948 B2* | 8/2019 | Hwang | A01M 1/2011 |
| 11,445,716 B2* | 9/2022 | Sandford | A01M 1/145 |
| 2006/0283076 A1* | 12/2006 | Chambers | A01M 1/14 43/114 |
| 2008/0086932 A1* | 4/2008 | Cook | A01M 1/02 43/107 |
| 2010/0242339 A1* | 9/2010 | Cuellar Bernal | A01M 1/145 43/107 |
| 2012/0285076 A1* | 11/2012 | Banfield | A01M 1/14 43/132.1 |
| 2016/0120164 A1* | 5/2016 | Li | A01M 1/026 43/114 |
| 2017/0013821 A1* | 1/2017 | Brown | A01M 1/14 |

* cited by examiner

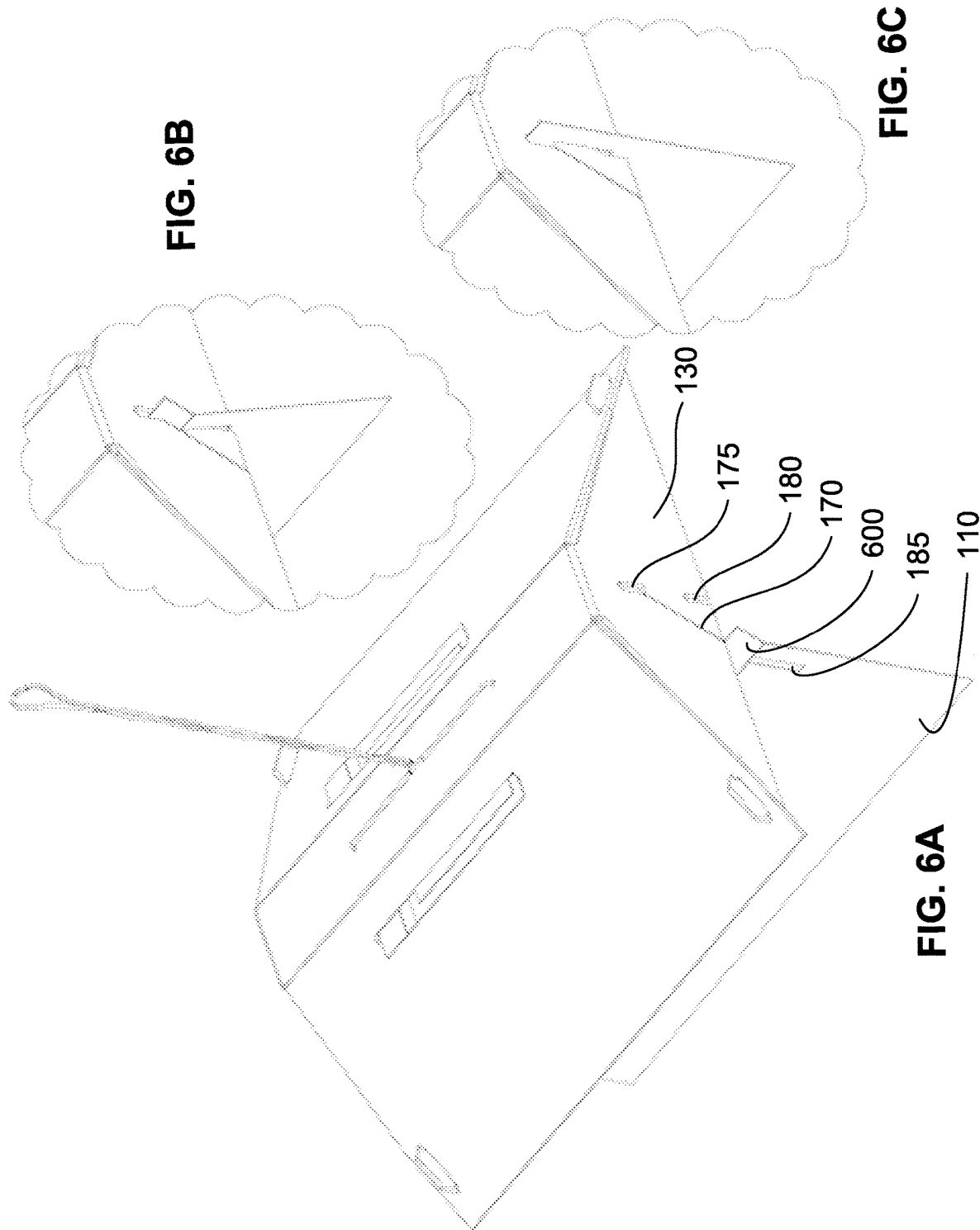

INSECT MONITORING SYSTEM

CROSS-REFERENCE TO RELATED APPLICATIONS

This application is a continuation-in-part of U.S. design application Ser. No. 29/901,987 filed on Sep. 7, 2023, the disclosure of which is incorporated by reference herein.

BACKGROUND OF THE INVENTION

Field of the Invention

The invention relates generally to the field of agriculture and more particularly to monitoring destructive pests.

Description of the Prior Art

A large variety of insect pests pose threats to commercial agricultural crops. In order to control these pests, it is typically necessary to monitor the agricultural fields for signs of infestation. One component of such monitoring is the use of distributed insect traps. Periodically, these traps need to be inspected to count the numbers of different insect species that have been collected to determine whether the field is, or is becoming, infested, and with what insects, in order to decide how and when to treat the field.

SUMMARY

The present invention is directed to an insect monitoring system, a method of assembling the insect monitoring system, and a kit containing the parts necessary to assemble the insect monitoring system. An exemplary insect monitoring system disclosed herein comprises a canopy, a lure, and an adhesive trap. The lure includes an insect attractant to draw insects to the monitoring system where they get caught on the adhesive trap. The canopy protects the lure and adhesive trap against the elements.

More specifically, an exemplary insect monitoring system according to the present invention comprises a canopy including two parallel opposing vertical sides and a cover spanning between the opposing sides, the cover having two portions that are mirror images of one another subtend an angle. The opposing vertical sides and the cover of the canopy can comprise, in some embodiments a single folded sheet of a rigid material. The cover optionally includes a third portion between the two portions, the third portion being disposed horizontally and parallel to the lure. The two portions of the cover each include a horizontal slit sized to receive the lure therethrough.

The opposing vertical sides of the canopy optionally include both an angled slit and a hole, where each angled slit extends from a bottom edge of the respective vertical side to the hole. In some of these embodiments each opposing vertical side includes a notch aligned with the hole and extending from the bottom edge towards the hole. The arrangement of angled slits, holes, and notches allows an adhesive trap to be suspended from the vertical sides, and removed later for inspection.

The exemplary insect monitoring system optionally can also comprise a means for hanging the insect monitoring system that attaches to the canopy. For example, the means for hanging can comprise a wire. In some embodiments the ends of the wire are disposed through holes in the canopy.

In an exemplary method for assembling an insect monitoring system, a sheet of a rigid material having holes and slits defined therethrough is received. Then, the sheet is folded to form a cover defined by two mirror image portions, each portion including two slits. Next, each of two parallel opposing vertical sides are attached to the cover, each side including two tabs. Each side is attached by inserting a first of the two tabs through a slit of the two slits of one portion of the cover and inserting a second of the two tabs through a corresponding slit of the other portion of the cover. In various embodiments, folding the sheet to form the cover includes folding the sheet to form three portions, wherein the three portions include the two mirror image portions and a third portion in the shape of a rectangle disposed between the other two portions. In some of these embodiments, the parallel opposing vertical sides are joined to the short sides of the third portion, and the sheet is folded along the two short sides before each of the two parallel opposing vertical sides are attached to the cover.

Once the canopy has been completed in this way, the lure, including a pouch having an insect attractant disposed therein, is inserted through a horizontal slit defined in each of the two portions of the cover. The adhesive trap, including a card having an adhesive disposed thereon, is then attached to the opposing vertical sides of the canopy such that the adhesive trap is held vertically beneath the lure. In some embodiments, each opposing vertical side includes an angled slit extending from a bottom edge thereof to a hole therethrough, the opposing vertical sides are mirror images of each other, and the adhesive trap includes two slits therethrough. Here, attaching the adhesive trap to the opposing vertical sides includes inserting the adhesive trap into the two angled slits.

An exemplary kit of the present invention comprises a packaged lure including a pouch having an insect attractant disposed therein, a packaged adhesive trap including a card having an adhesive disposed thereon, and a precut sheet of a rigid material cut to define two portions, the portions being mirror images of each other, each portion including two tab-receiving slits and one horizontal slit. The kit optionally further comprises a means for hanging an insect monitoring system assembled from the precut sheet, lure, and adhesive trap.

BRIEF DESCRIPTION OF DRAWINGS

FIGS. 6A-6C show another exemplary step of the assembly of the insect monitoring system according to various embodiments.

DETAILED DESCRIPTION

The present disclosure is directed to an insect monitoring system that is simple to deploy, for example, in orchards and that includes a lure to attract insects and an adhesive material on which insects drawn to the lure can be trapped for later evaluation. In various embodiments, the insect monitoring system ships flat, is simple to assemble, and simple to replace depleted lures and used adhesive material.

Figure 1:
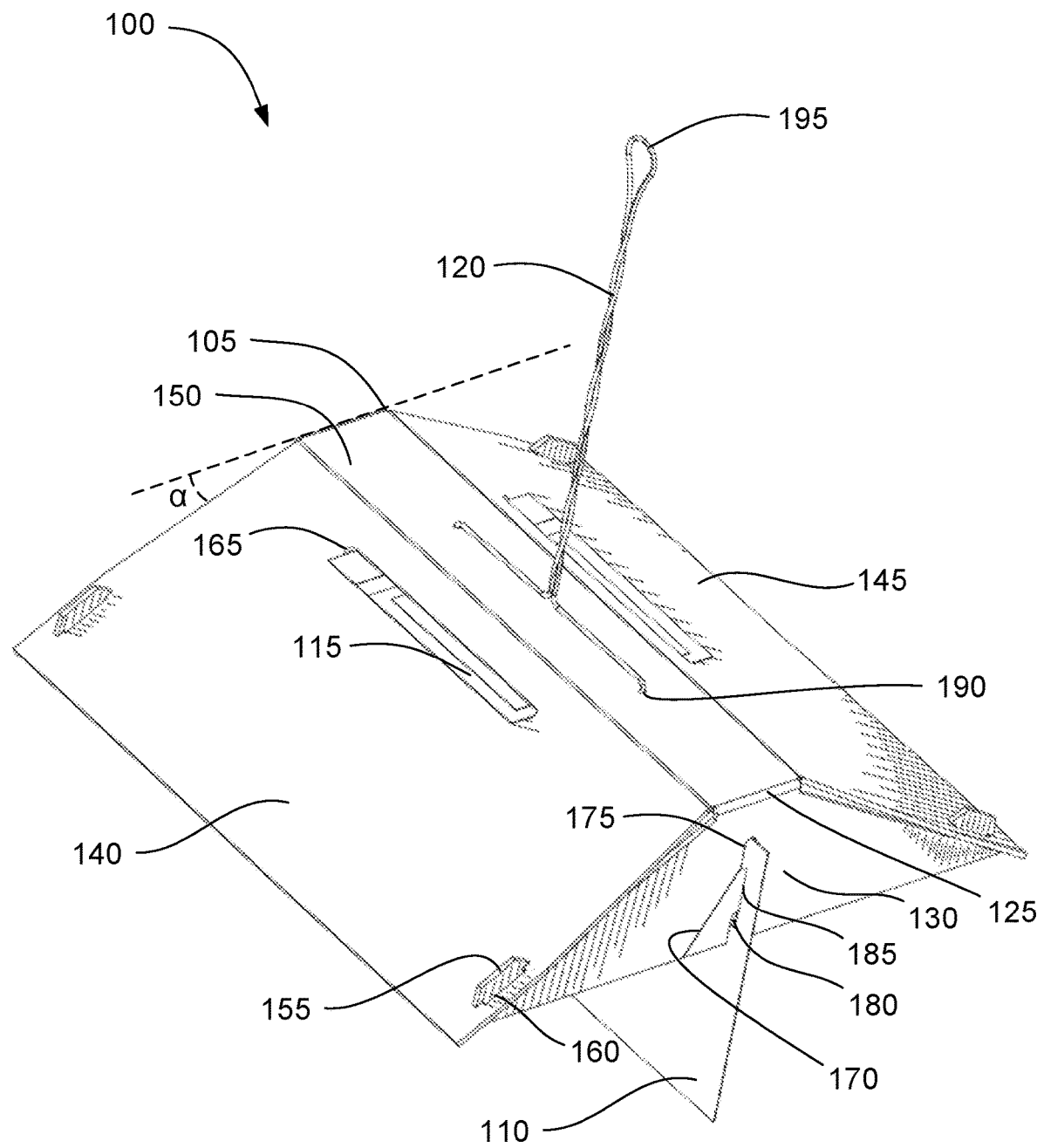
FIG. 1 is a top perspective view of an exemplary insect monitoring system according to various embodiments.

FIG. 1 provides a prospective view of an exemplary insect monitoring system 100 according to various embodiments. The monitoring system 100 comprises a canopy 105, an adhesive trap 110, a lure 115, and means 120 for hanging the monitoring system 100, such as from a tree.

The canopy 105 is preferably made from a sheet of a rigid material such as plastic, card stock, or cardboard. An exemplary plastic comprises polypropylene. For example, 2 mm, 3 mm, or 4 mm thick corrugated plastic can be used. The sheet is folded, such as along scored lines, to form a cover 125 and two parallel opposing vertical sides 130, 135. The cover 125 of the canopy 105 includes two portions 140, 145 that subtend an angle, (180-2α), and optionally includes a flat third portion 150 joining the two portions 140, 145, as shown. In embodiments without the third portion 150, the two portions 140, 145 meet along a line. The angle, α, is the angle each portion 140, 145 makes with the horizontal, which can be between 25° and 35°, for instance 30°.

Advantageously, the sheet of rigid material can be patterned, for instance, with score lines, cut-out areas, and with holes, slits, and notches, such as by die cutting. Thus, multiple canopies 105 can be shipped as a stack of sheets together with a set of lures 115, also packed as multiple individually-wrapped stacked sheets, and a stack of adhesive traps 110, similarly packed as multiple individually-wrapped stacked sheets. In the field, a worker can rapidly fold-up a canopy 105, insert a lure 115, add means 120 for hanging, and install an adhesive trap 110, then hang the system 100.

The two sides 130, 135 of the canopy 105 are joined to the two portions 140, 145 of the cover 125. In some embodiments, as illustrated in FIG. 1, the sides 130, 135 include tabs 155, the two portions 140, 145 include slits 160, and the tabs 155 fit through the slits 160 to hold the sides 130, 135 in place. In other embodiments the sides 130, 135 can be attached to the two portions 140, 145 of the cover 125 with adhesive strips, for instance.

The two portions 140, 145 of the cover 125 each include, in various embodiments, a horizontal slit 165 sized such that the lure 115 can be inserted through both slits 165. In this way the lure 115 is retained in a horizontal orientation by the cover 125. It can be seen that the lure 115 is held by friction and can be readily removed and replaced.

The two sides 130, 135 of the canopy 105 are configured to retain the adhesive trap 110 in a vertical orientation between them, and beneath the lure 115. As illustrated, in some embodiments each of the sides 130, 135 includes an angled slit 170 extending from a bottom edge to a hole 175. In some of these embodiments each of the sides 130, 135 further includes a notch 180 aligned beneath the hole 175 and extending towards the hole 175 from the bottom edge.

The adhesive trap 110 can be in the form of a paper or plastic card having an adhesive layer on both sides. In embodiments that include the angled slit 170 and hole 175, the adhesive trap 110 includes two vertical slits 185 spaced apart by the same distance that separates the two sides 130, 135. In these embodiments, a top edge of the trap 110 can be inserted through the two angled slits 170 until the top edge is within the hole 175. The vertical slits 185 allow the adhesive trap 110 to then be rotated to a vertical orientation. As with the lure 115, the adhesive trap 110 can be readily removed and replaced. This is further described with respect to FIGS. 6A-6C.

In other embodiments the adhesive trap 110 attaches to the two sides 130, 135 with adhesive strips. In still other embodiments, the two sides 130, 135 each includes a long vertical slit, the adhesive trap 110 is pushed up through the two vertical slits, and the portions of the adhesive trap 110 that extend outside of the canopy 105 are taped to the respective sides 130, 135. In some of these embodiments the portions of the adhesive trap 110 that extend outside of the canopy 105 are folded to lay flat against the respective sides 130, 135 then taped in place.

The means 120 for hanging the monitoring system 100 attaches to the canopy 105. In the illustrated embodiment the means 120 comprises a wire that is fed through holes 190 in the cover 125 of the canopy 105. Optionally, the wire also is fed through a hole (not shown) in the lure 115 that is aligned beneath one of the holes 190. This serves to further secure the lure 115. The means 120 can include a top loop 195 that can be placed over a branch or a nail or some other protrusion from which the monitoring system 100 can be suspended. The means 120 can include, instead of a top loop 195, a hook such as that of a clothes hanger.

Figure 2:
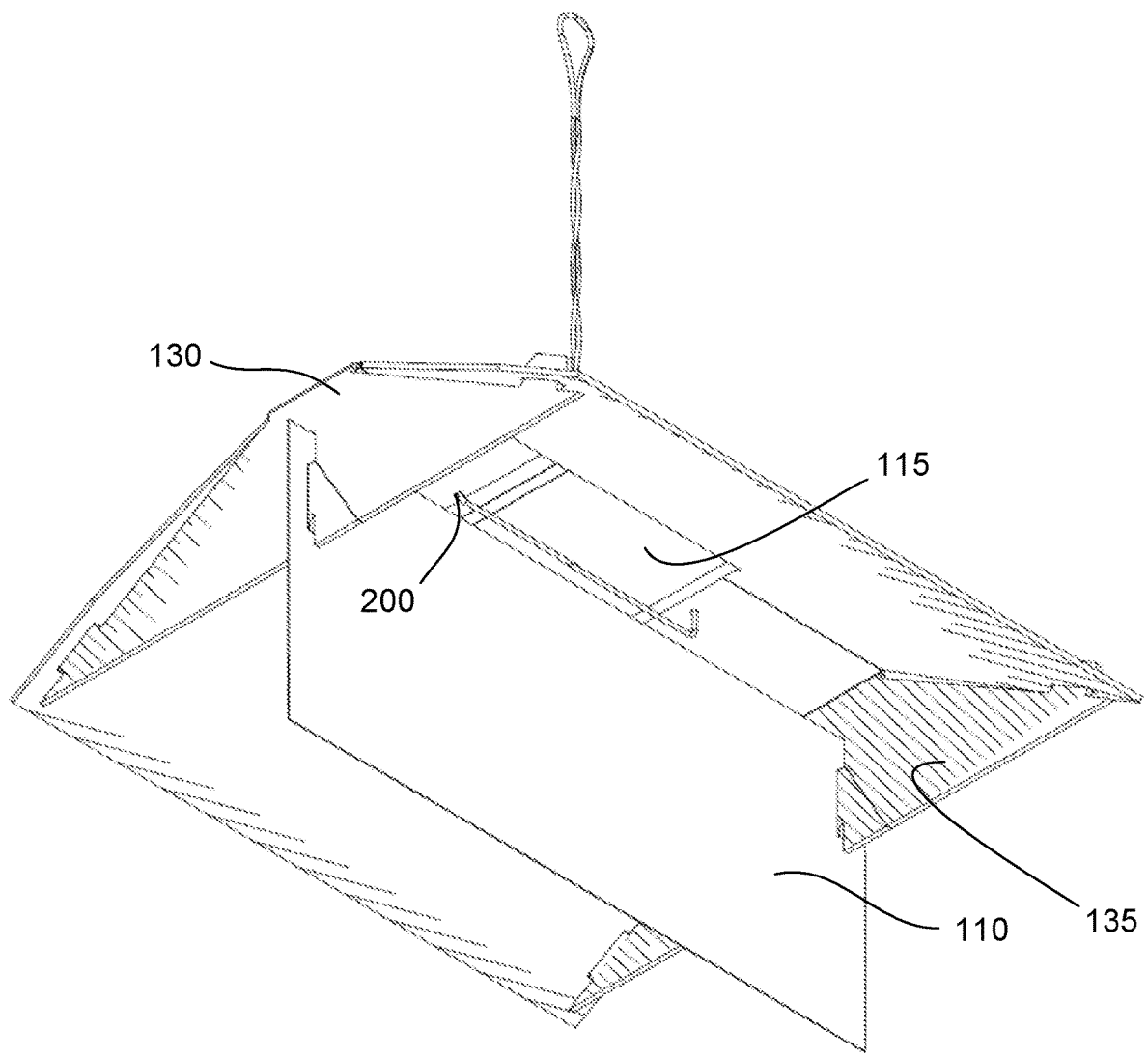
FIG. 2 is a bottom perspective view of the insect monitoring system of FIG. 1.

FIG. 2 shows a bottom perspective view of the insect monitoring system 100. The bottom view shows the optional hole 200 through the lure 115 through which the means 120 is disposed in this embodiment. In the given embodiment the wire of the means 120 is continuous from one hole 190 to the other, but in other embodiments the wire is not continuous in this way, and has to ends that each extend through a respective hole 190 and are bent under the cover 125. The means 120 can also comprise a rod with a threaded end that extends through a single hole 190 in the cover 125 and is secured by a washer and nut.

The lure 115, in some embodiments, comprises a pouch made from barrier layer, semipermeable layers, and peelable layers with the attractant disposed between the outside barrier layer and the semipermeable layers. In order to monitor for Spotted Wing Drosophila (SWD), for example, suitable attractants include a formulated combination of acetic acid ethanol, 3-hydroxy-2-butanone, 3-(methylthio)-1-propanol, and Klucel H IND.

The adhesive trap, in various embodiments, comprises 20 mil thick low-density polyethylene (LDPE) substrate coated with a hot melt adhesive.

Figure 3:
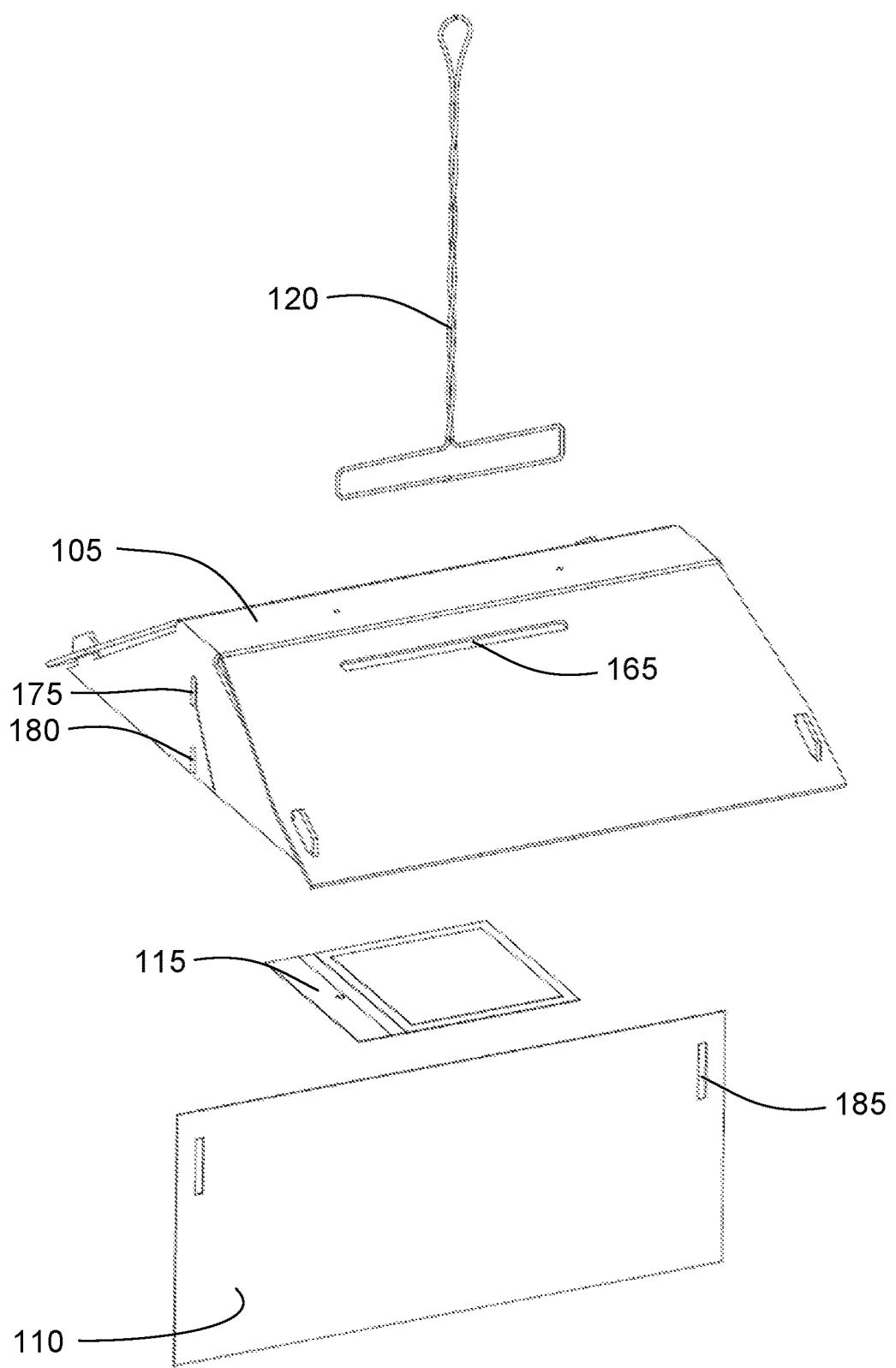
FIG. 3 is an exploded view of the insect monitoring system of FIG. 1.

FIG. 3 shows an exploded view of the insect monitoring system 100.

Figure 4:
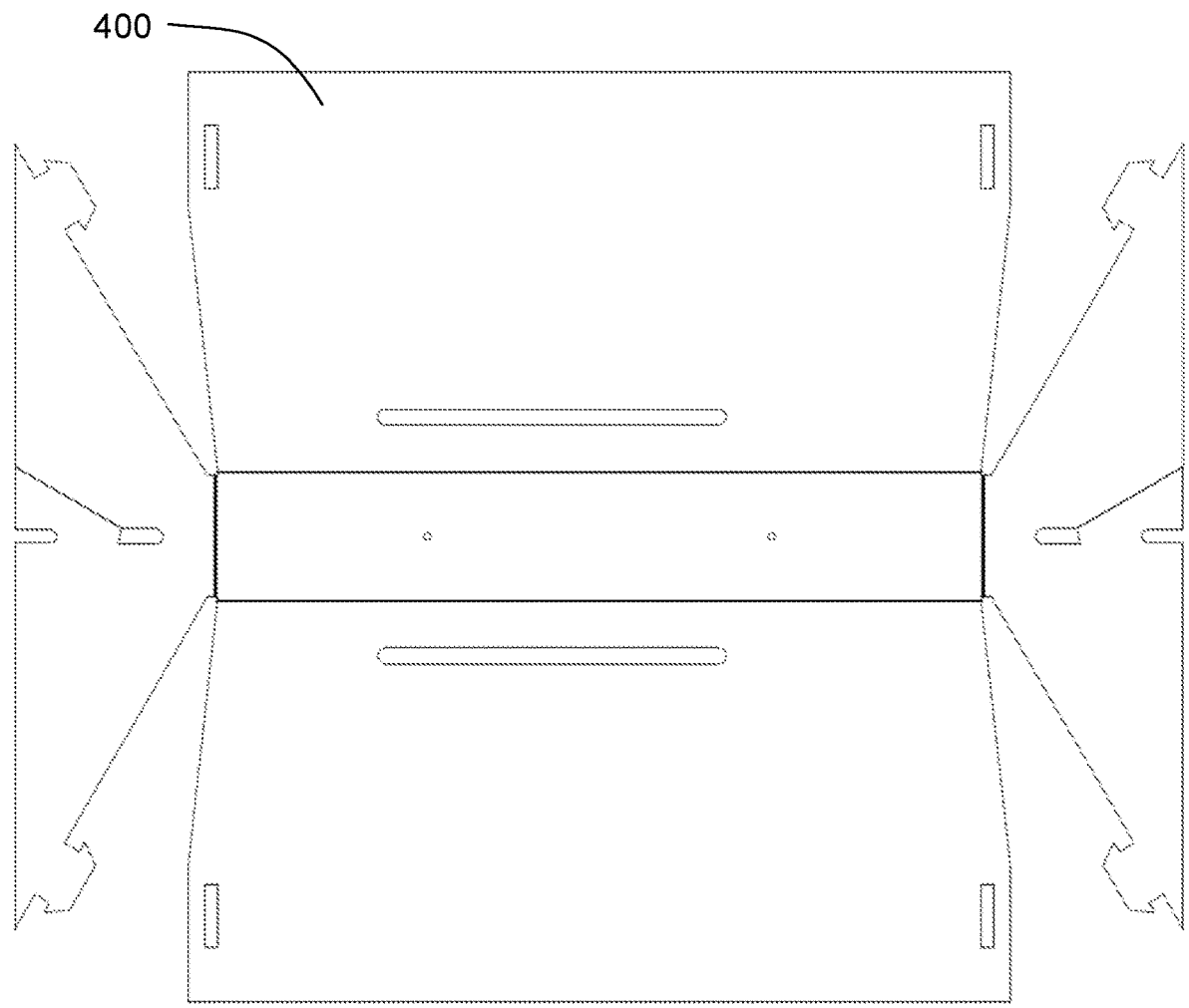
FIG. 4 is a top view of an exemplary canopy before assembly, according to various embodiments.

FIG. 4 shows an exemplary flat sheet 400 that can be folded to form the canopy 105. In embodiments without the third portion 150, the vertical sides 130, 135 can be separate pieces, each can include two or more tabs 155 and the two portions 140, 145 of the cover 125 include appropriate corresponding slits 160.

Figure 5:
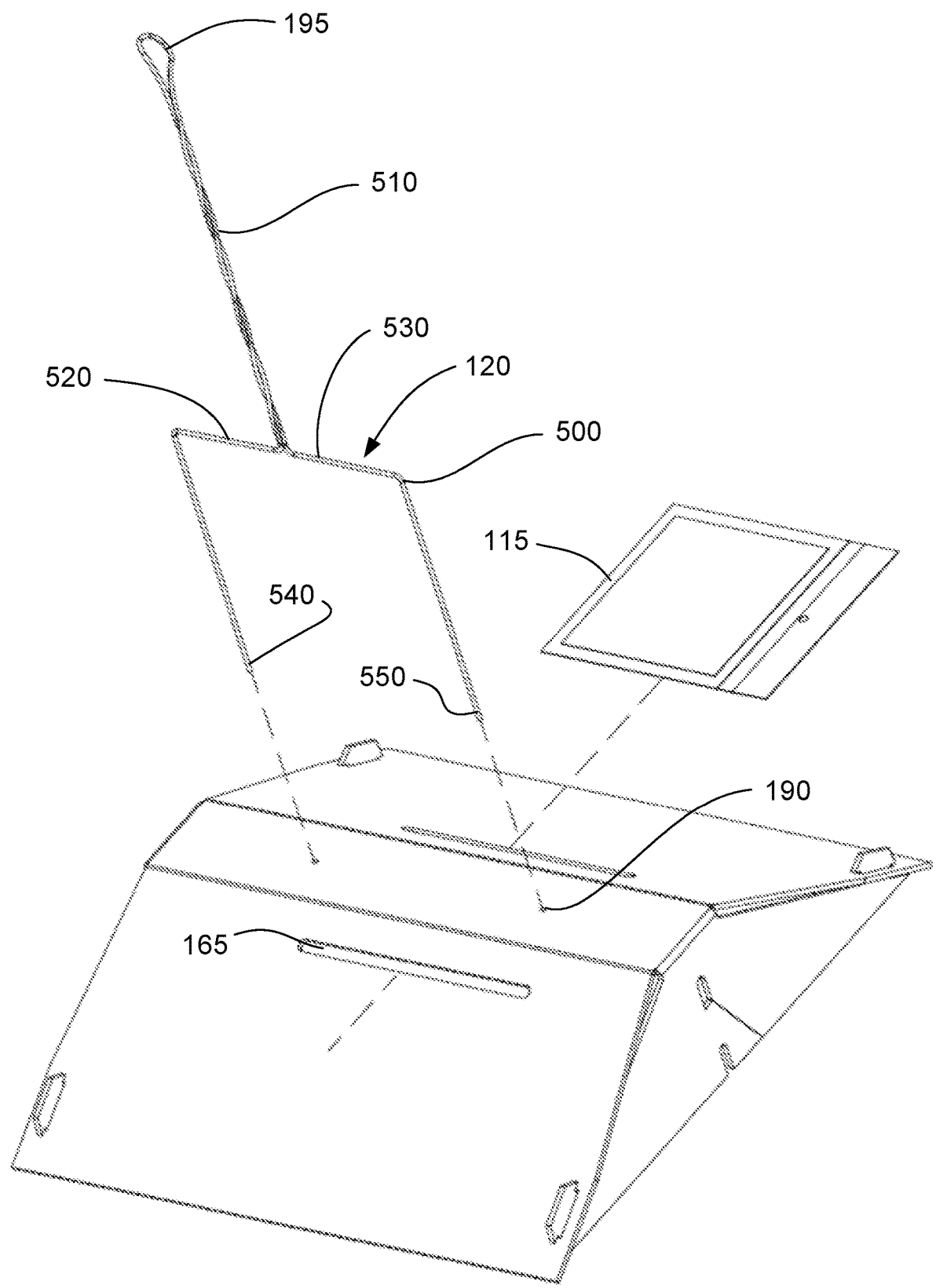
FIG. 5 shows exemplary steps of the assembly of an insect monitoring system according to various embodiments.

FIG. 5 shows steps of the assembly of the insect monitoring system 100 following forming of the canopy 105. First, the lure 115 is inserted through the horizontal slits 165 defined in each of the two portions 140, 145 of the cover 125. In some embodiments, this includes aligning a hole 200 through the lure 115 with a hole 190 in the cover 125.

Next, in the illustrated embodiment, means 120 for hanging are attached. In the illustrated embodiment the means 120 comprises a single wire 500 formed into a loop 195 at the middle of the length of the wire 500, with the two halves of the wire 500 twisted around each other to form a length 510 with some rigidity. The remaining ends 520, 530 of the wire 500 are bent perpendicular to the length 510 and pointing away from each other, and then bent again to be parallel to the length 510. In these embodiments the free ends 540, 550 of the wire 500 are inserted completely through holes 190 in the cover 125, bent towards one another, and optionally further twisted together.

Other means 120 for hanging the insect monitoring system 100 include looping a string through the holes 190, and taping or gluing a string to the top of the canopy 105. The sheet 400 can also be fabricated with a tab having a hole disposed at the center of the third portion 150 that can be folded up so that a wire or thread can be threaded through the hole.

FIGS. 6A-6C illustrate an exemplary step for attaching the adhesive trap 110 to the opposing vertical sides 130, 135. As shown in FIG. 6A, in some embodiments of the adhesive trap 110, a top of the adhesive trap 110 comprises a strip 600 that runs the length of the adhesive trap 110. Attaching the adhesive trap 110 to the opposing vertical sides 130, 135 comprises, in these embodiments, bending the strip 600 relative to the remainder of the adhesive trap 110 to match the angle of the slit 170. Then, as shown in FIG. 6B, the strip 600 is pushed up along the slit 170, and then as illustrated by FIG. 6C the strip 600 fits into the holes 175 and the vertical slits 185 allow the adhesive trap 110 to be disposed vertically. As noted above, in other embodiments the adhesive trap 110 does not include the strip 600 and is installed similarly.

The present invention also includes a kit for an insect monitoring system. Such a kit comprises a packaged lure, a packaged adhesive trap, and a precut sheet of a rigid material. The kit optionally further comprises a means for hanging an insect monitoring system assembled from the precut sheet, lure, and adhesive trap. The lure is packaged to keep the insect attractant from dissipating until the monitoring system is deployed, and can comprise a foil pouch, for instance. The adhesive trap is likewise packaged to keep the adhesive from becoming contaminated before the monitoring system is deployed. Packaging for the adhesive trap can include peel-off paper backing and/or a foil pouch.

As noted previously, precut sheets can be stacked for shipment. As used herein, a kit can be an assembly of one packaged lure, one packaged adhesive trap, and one precut sheet of a rigid material packed together, but can also comprise a package of precut sheets with a number of packaged lures and a number of packaged adhesive traps. In various embodiments a kit can include more lures, and/or more adhesive traps than precut sheets to accommodate the reuse of assembled canopies.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. An insect monitoring system comprising:
   a canopy including two parallel opposing vertical sides and a cover spanning between the opposing sides, the cover having two portions that subtend an angle, wherein each opposing vertical side includes an angled slit and a hole, each angled slit extending from a bottom edge of the respective vertical side to the hole;
   an adhesive trap held vertically between the two opposing sides of the canopy;
   a lure held horizontally between the two portions of the cover and above a top edge of the adhesive trap; and
   means for hanging the insect monitoring system, the means attaching to the canopy.

2. The insect monitoring system of claim 1 wherein the cover includes a third portion between the two portions, the third portion being disposed horizontally and parallel to the lure.

3. The insect monitoring system of claim 1 wherein the two portions of the cover each include a horizontal slit sized to receive the lure therethrough.

4. The insect monitoring system of claim 1 wherein the opposing vertical sides each includes a tab, the two portions of the cover each includes slits, and each tab extends through one of the slits.

5. The insect monitoring system of claim 1 wherein each opposing vertical side includes a notch aligned with the hole and extending from the bottom edge towards the hole.

6. The insect monitoring system of claim 1 wherein the opposing vertical sides and the cover of the canopy comprise a single folded sheet of a rigid material.

7. The insect monitoring system of claim 1 wherein the means for hanging the insect monitoring system includes a wire.

8. The insect monitoring system of claim 7 wherein the cover includes two holes therethrough and the wire is disposed through the two holes.

9. The insect monitoring system of claim 8 wherein the lure includes a hole disposed therethrough, the hole in the lure is aligned with one of the two holes in the cover, and the wire is also disposed through the hole in the lure.

* * * * *